United States Patent [19]

Bannon et al.

[11] Patent Number: 5,027,892

[45] Date of Patent: Jul. 2, 1991

[54] PETAL DEPLOYABLE RADIATOR SYSTEM FOR SPACECRAFT

[75] Inventors: David G. Bannon, Rockford; Leslie L. Bevans, Roscoe, both of Ill.

[73] Assignee: Sundstrand Corporation, Rockford, Ill.

[21] Appl. No.: 379,188

[22] Filed: Jul. 13, 1989

[51] Int. Cl.$^5$ .............................................. B64G 1/50
[52] U.S. Cl. ...................................... 165/41; 165/86; 244/163; 244/158 R
[58] Field of Search ............... 165/41, 86; 244/158 R, 244/163, 173

[56] References Cited

U.S. PATENT DOCUMENTS

| | | | |
|---|---|---|---|
| 3,347,309 | 10/1967 | Webb | 165/86 |
| 3,496,995 | 2/1970 | Rosen et al. | 165/86 |
| 3,733,758 | 5/1973 | Maier et al. | 244/173 |
| 4,369,715 | 1/1983 | Ingersoll et al. | |
| 4,393,541 | 7/1983 | Hujsak et al. | 244/173 |
| 4,561,614 | 12/1985 | Olibara et al. | 244/173 |

FOREIGN PATENT DOCUMENTS 3042923 7/1982 Fed. Rep. of Germany .

OTHER PUBLICATIONS

NASA JPL Technical report 32-1519, "Lightweight Solar Panel Development" by Walter A. Hasbach, Mar. 15, 1971, pp. 2–7, 15 and 16.
Proc. European Symp. on Photovoltic Generators in Space, "Development of a Rigid Fold-Out Solar Array for 3 Axes-Stabilized Geosynchronous Satellites": by G. Barkots, Nov., 1978, pp. 169–171.
Heat Rejection System Development Programs, 1 page not dated.

Primary Examiner—Albert W. Davis, Jr.
Attorney, Agent, or Firm—Antonelli, Terry, Stout & Kraus

[57] ABSTRACT

An arrangement for mounting a panel on a spacecraft employs a spring sheet which serves to mount one end of the panel to the spacecraft for pivoting the panel with respect to spacecraft and which is capable of storing spring energy for actuating the panel to pivot it from one of a stowed position and a deployed position to the other. In the preferred embodiment, the panel is a radiator for rejecting waste heat into outer space from a dynamic isotope power system of the spacecraft.

19 Claims, 2 Drawing Sheets

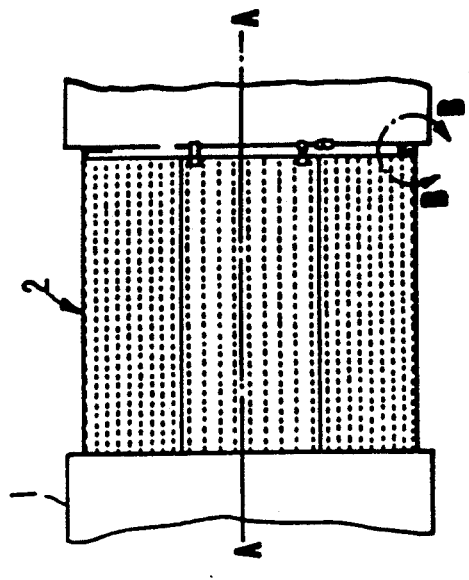
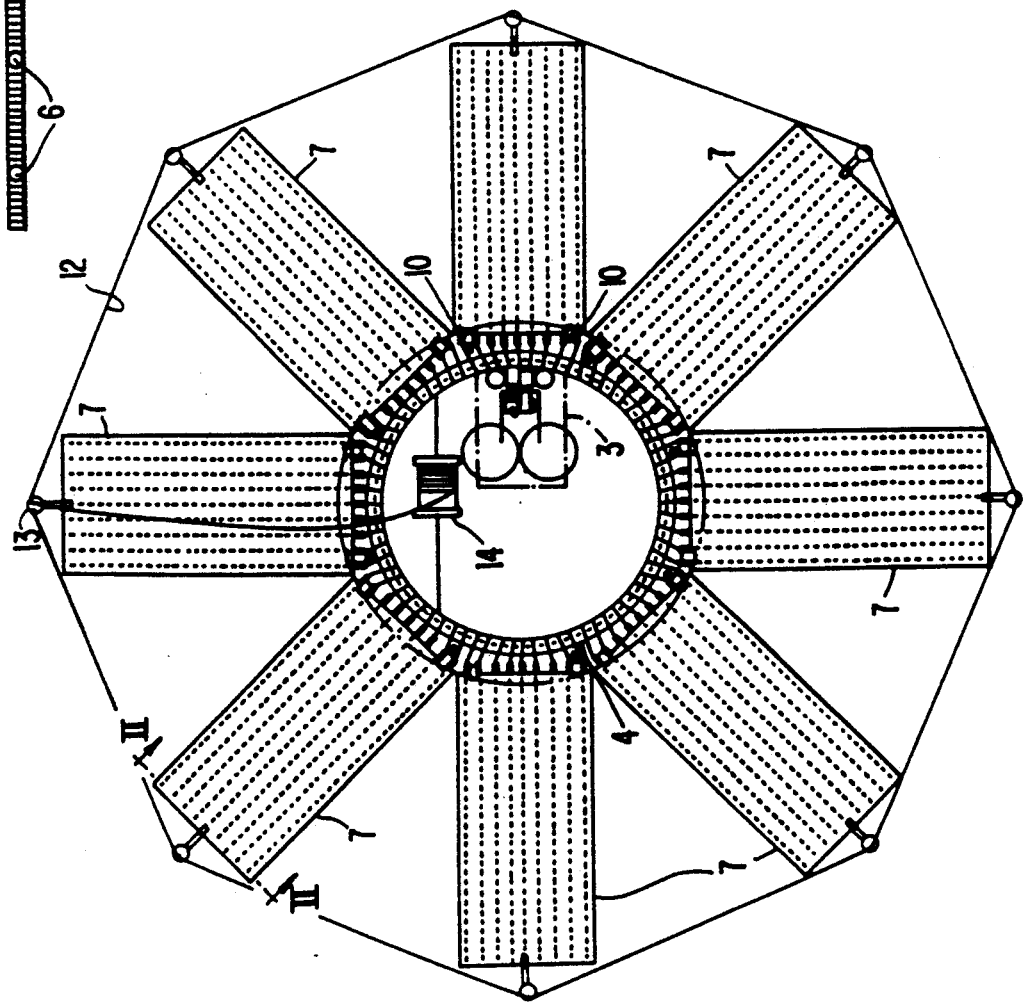

PETAL DEPLOYABLE RADIATOR SYSTEM FOR SPACECRAFT

TECHNICAL FIELD

The present invention is directed to an arrangement and method for deploying a panel on a spacecraft and more particularly, to a deployable radiator system for rejecting waste heat into outer space from a dynamic isotope power system of the spacecraft.

BACKGROUND ART

A dynamic isotope power system in a spacecraft such as a satellite, has an organic Rankine cycle which requires a radiator/condenser system to reject waste heat to space. Due to the demands for limiting the radiator area on the spacecraft, there is a need for a radiator system which can be deployed from a stowed position to a deployed position where both sides of the radiator can serve to reject waste heat to space thereby minimizing the necessary radiator area and weight. An arrangement for mounting a panel, such as a radiator panel, on a spacecraft must also have great reliability and be lightweight.

Arrangements for deploying solar panels on spacecraft are known from NASA JPL Technical Report 32-1519 entitled "Lightweight Solar Panel Development" by Walter A. Hasbach, Mar. 15, 1971, pages 2–7, 15 and 6, for example. An inflatable radiator system for a satellite has been disclosed by Vought Systems Division of LTV Aerospace Corporation as indicated in a publication entitled "Heat Rejection Systems Development Programs". German Offenlegungsschrift DE 3,042,923 July 1, 1982, discloses a clamping arrangement for spacecraft solar panels using cables with sprung bands connected thereto for holding down and deploying panels. U.S. Pat. No. 3,347,309 discloses radiator tubes which are pivotably mounted at one end for deployment. A torsion spring actuator at hinged connections between solar panels and a spacecraft is shown in FIGS. 10 and 13 of the Proceedings European Symposium on Photovoltaic Generators in Space, "Development Of A Rigid Fold-Out Solar Array For 3 Axes-Stabilized Geosynchronous Satellites" by G. Barkots, Nov., 1978, pp. 169–171. U.S. Pat. No. 4,369,715 discloses a resilient hinge assembly for a display structure for merchandising goods wherein a band of plastic material incorporates a central flexible bridge interconnecting a pair of end elements. A leaf spring extends across the flexible bridge and is connected to the end elements for imparting a required degree of restoration force to the assembly.

DISCLOSURE OF INVENTION

An object of the present invention is to provide an arrangement and method for mounting and deploying a panel on a spacecraft, particularly a radiator panel for rejecting waste heat into outer space from a dynamic isotope power system of a spacecraft. An additional object is to provide an improved arrangement of the aforementioned type which is simple, lightweight and has no relative motion between parts of the hinge for greater reliability as compared with a conventional hinge actuator mechanism.

These and other objects are attained by the arrangement for mounting a panel on a spacecraft according to the invention, which arrangement comprises a panel, means for mounting one end of a panel on a spacecraft for pivoting the panel with respect to the spacecraft between a stowed position and deployed position, and actuation means comprising a spring sheet capable of storing spring energy and extending between the panel and the spacecraft for actuating the panel to pivot it from one of the stowed and deployed positions to the other. In the disclosed embodiment the spring sheet serves as both the means for mounting and the actuation means. This arrangement is particularly advantageous in that there is no relative movement between parts of the hinge and there is greater reliability than with a conventional hinge actuator mechanism. The arrangement is also simple and lightweight because a single member acts as both a hinge and a device for storing spring energy for actuating the panel.

According to the disclosed embodiment of the invention, the panel of the spacecraft is a radiator panel which comprises heat pipes including flexible sections of heat pipes extending between the pivotably mounted end of the panel and the spacecraft to allow pivoting of the panel. The spring sheet extends parallel to the longitudinal centerline of the flexible sections of the heat pipes. This orientation assures that the flexible portion of the heat pipes are not unduly stretched or compressed during pivoting of the panel relative to the spacecraft. This feature of the invention enables the design of the internal heat pipe to be simplified with respect to its screen wick, arteries, etc. A further feature of the invention involves the use of a mandrel which is provided for engaging the spring sheet in one or both positions for providing rigidity to the actuation means in that position.

The spacecraft in the disclosed embodiment is provided with a plurality of the radiator panels which are arranged about the outer periphery of the satellite. An end of each panel is mounted to the spacecraft by means for mounting and pivoting the panels with respect to the spacecraft and a plurality of actuation means are provided, each comprising a spring sheet capable of storing energy and extending between a respective panel and the spacecraft for actuating the panels to pivot them from one of a stowed or deployed positions to the other position. The actuation of the plurality of panels by the spring sheets is controlled through the use of a common restraining cable which extends between the several panels and a means for retrievably paying out the cable. In the disclosed embodiment the panels are stowed in a position extending along an outer surface of the spacecraft and are deployed to a position in a plane extending radially and perpendicular to an axes of a spacecraft.

The deployable radiator system of the invention for rejecting waste heat into outer space from a dynamic isotope power system of a spacecraft further involves the use of a condenser mounted on the spacecraft. The condenser is a toroidal shear flow controlled condenser in the disclosed embodiment. A heat pipe evaporator is provided in thermal conducting relation to the condenser. The heat pipe evaporator is in fluid communication with the heat pipe radiator panels via flexible sections of heat pipes which permits the panels to the pivoted relative to the spacecraft for movement between a stowed position and a deployed position. One end of each panel is mounted to the spacecraft by means of a spring sheet extending between the panel and the spacecraft at the other side thereof. The spring sheet acts as both a hinge type of connection between the panel and the spacecraft and as a device which stores spring energy for actuating the panel to pivot it from the stowed position to the deployed position.

From the above, it can be seen that the method of the invention for deploying a panel on a spacecraft comprises the steps of mounting one end of a panel on a spacecraft for pivoting the panel with respect to the spacecraft by means of at least one spring sheet which is capable of storing energy and which extends between the panel and the spacecraft, and actuating the panel to pivot it from one of a stowed position or a deployed position to the other utilizing stored spring energy of the spring sheet.

These and other objects, features and advantages of the present invention will become more apparent from the following description when taken in connection with the accompanying drawings, which show, for purposes of illustration only, one embodiment in accordance with the present invention.

BRIEF DESCRIPTION OF DRAWINGS

FIG. 1 is an end view of a deployable radiator system of a satellite taken along the longitudinal axis A—A of the satellite and showing the eight radiator panels of the radiator system in the deployed position;

FIG. 2 is a cross-sectional view through one of the radiator panels taken along the line II—II in FIG. 1;

FIG. 3 is a side elevational view of the deployable radiator system of FIG. 1 showing the radiator panels in the stowed position on the satellite;

BEST MODE FOR CARRYING OUT THE INVENTION

Figure 5:
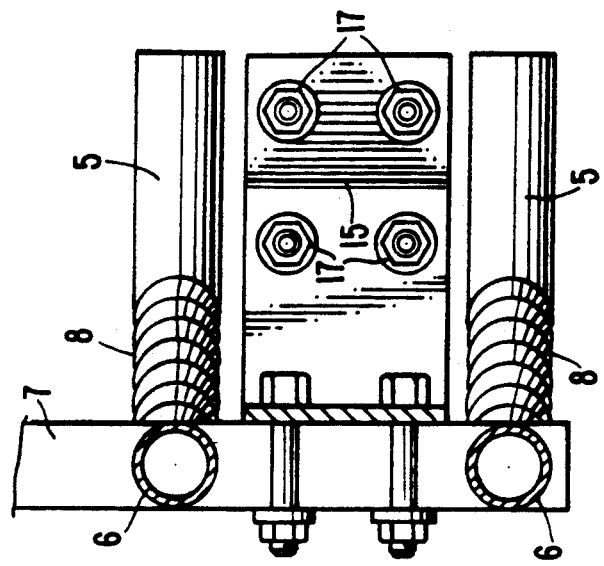
FIG. 5 is a cross-sectional view of a portion of the mounting arrangement taken along the line V—V of FIG. 4.
Figure 4:
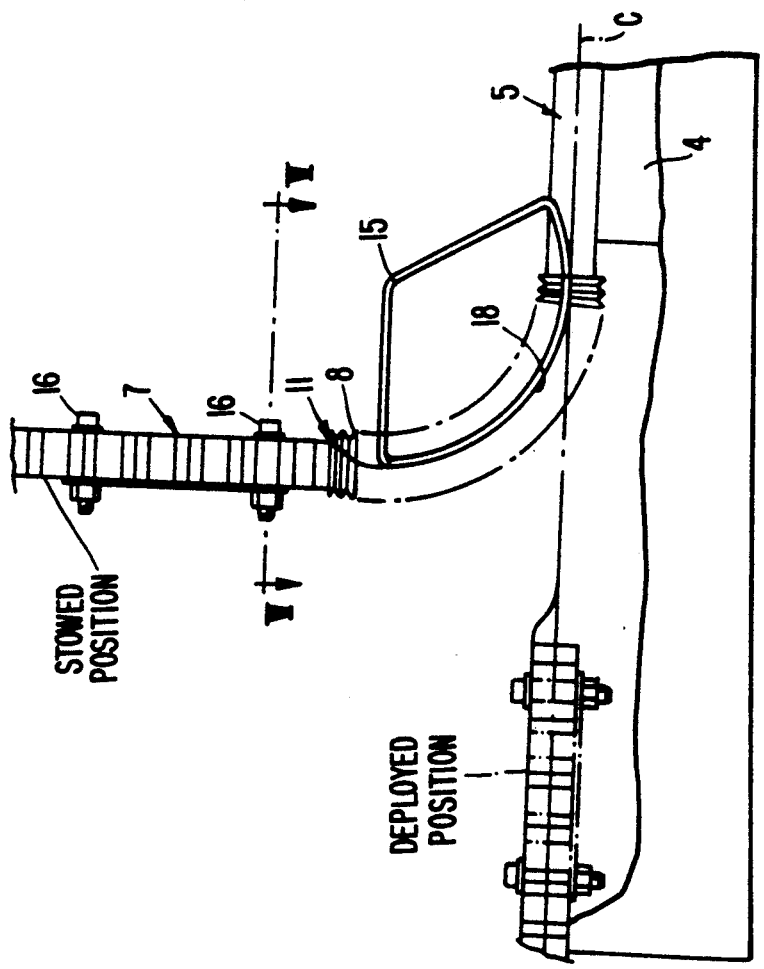
FIG. 4 is an enlarged view of the arrangement for mounting a panel of the radiator system on the spacecraft in the area B—B of FIG. 3.

Referring now to the drawings, a satellite 1 comprises a deployable radiator system 2 for rejecting waste heat into outer space from a dynamic isotope power system 3 of the satellite. The organic Rankine cycle of the power system requires a radiator/condenser system to reject waste heat to space. Because of the limited radiator area on the satellite 1, deployable radiator panels are necessary to provide a sufficient radiator area for the rejection of waste heat to space.

More particularly, the deployable radiator system according to the invention comprises a toroidal shear flow controlled condenser 4 mounted on the spacecraft and a heat pipe evaporator 5 in thermal conducting relation to the condenser 4. The heat pipe evaporator 5 is in fluid communication with heat pipes 6 of radiator panels 7 via flexible sections 8 of the heat pipes which permit the panels to be pivoted relative to the spacecraft for movement between a stowed position as shown in FIG. 3 wherein the panels 7 extend along an outer surface of the spacecraft and a deployed position seen in FIG. 1 wherein the panels are in a plane extending radially perpendicular to a longitudinal axis A—A of the spacecraft.

As depicted in FIG. 1, the deployable radiator system comprises eight deployable heat pipe radiator panels 7 which are linked to the toroidal shear flow controlled condenser 4 by the flexible heat pipe sections 8. In the stowed position one side of the radiator panels faces outward forming the exterior surface of the spacecraft. The adiabatic flexible sections 8 of the heat pipes are bent at a 90° angle when the panels are in the stowed position as shown in FIG. 3. The top edges of the panels 7 form an octagon inscribed within the spacecraft envelope. The panels are deployed into a plane extending radially and perpendicular to the axis of the satellite as shown in FIG. 1.

The panels 7 are mounted to the spacecraft at their end having the flexible sections 8 of the heat pipes by means of the actuator mechanism 10 at the corners of the panel end.

The actuator mechanism 10 according to the invention is formed of a spring tempered steel sheet segment attached to the end of an associated radiator panel 7 and to the spacecraft structure. The spring sheet replaces a conventional hinge type of connection and is capable of storing spring energy for actuating the panel by pivoting from the stowed position to the deployed position.

The spring sheet 11 of the actuator mechanism 10 is straight in its natural position when the panels are deployed. The spring sheet is then bent into a circular quarter arc as the panel is rotated 90° into the stowed position. The spring energy stored in the sheet when bent 90° is sufficient to the deploy the panel.

The panels 7 are controlled during the spring sheet deployment by a common restraining cable 12. The cable is laced through eyelets 13 at the center of the outer edge of the panels. The cable is then routed back to a reel 14 located at a central location on the spacecraft structure. When the panels are unlatched at their outer ends through the use of a conventional latch, not shown, the cable resists the actuation forces in the sheet springs. By paying out the cable at a specified rate, the panels 7 can be pivoted outward into the deployed position.

A pair of mandrels 15 are provided per panel 7 for engaging the spring sheet 11 in the stowed position for providing rigidity to the spring sheet in this position. The mandrels 15 are secured to the spacecraft by bolting, for example. The respective ends of the spring sheets 11 are also fastened to the radiator panel and spacecraft by means of threaded fasteners 16 and 17 as shown in FIG. 5. The mandrels have an outer surface 18 which supports the spring sheet 11 so that it extends along the centerline C of the flexible sections 8 of the heat pipes 6 extending between the radiator panels 7 and the heat pipe evaporator 5. This arrangement minimizes the risk of damage during deployment by equalizing the degree of strain of the outside surfaces of the flexible section. The mandrels also control the static position of the panels 7 in the stowed position by providing rigidity in the hinge type connection which prevents flexing of the connection which could damage the system.

While we have shown and described only one embodiment in accordance with the present invention, it is understood that the same is not limited thereto, but is susceptible to numerous changes and modifications as known to those skilled in the art. Therefore, we do not wish to be limited to the details shown and described herein, but intend to cover all such changes and modifications as are encompassed by the scope of appended claims.

We claim:

1. An arrangement for mounting a panel on a spacecraft comprising a panel, means for mounting one end of the panel on a spacecraft for pivoting the panel with respect to the spacecraft between a stowed position and a deployed position, and actuation means comprising a spring sheet capable of storing spring energy and extending between the panel and the spacecraft for actuating the panel to pivot it from one of the stowed and deployed positions to the other, wherein the spring sheet serves as both the means for mounting and the actuation means.

2. The arrangement according to claim 1, wherein the spring sheet is formed of a sheet of spring tempered steel.

3. The arrangement according to claim 1, wherein said panel is a radiator panel.

4. The arrangement according to claim 3, wherein the radiator panel comprises heat pipes including flexible sections of heat pipes extending between the one end of the panel and the spacecraft to allow pivoting of the panel.

5. The arrangement according to claim 1, wherein a plurality of panels are arranged about the outer perimeter of the spacecraft, an end of each panel being mounted to the spacecraft by means for mounting for pivoting the panel with respect to the spacecraft and a plurality of actuation means being provided, each comprising a spring sheet capable of storing energy and extending between a respective panel and the spacecraft for actuating the panel to pivot it from one of the stowed and deployed positions to the other.

6. The arrangement according to claim 5, further comprising means for controlling the actuation of the plurality of panels by the actuation means.

7. The arrangement according to claim 6, wherein the means for controlling actuation comprises a common restraining cable which extends between the panels and the spacecraft and means for retrievably paying out the cable for controlling the pivoting movement of the panels by the actuation means.

8. The arrangement according to claim 5, wherein each of the spring sheets serves as both the means for mounting an end of its associated panel for pivoting with respect to the spacecraft, and the actuation means.

9. The arrangement according to claim 5, wherein the panels are stowed in a position extending along an outer surface of the spacecraft and deployed in a position in a plane extending radially and perpendicular to an axis of the spacecraft.

10. The arrangement according to claim 5, wherein the spacecraft is a satellite.

11. An arrangement for mounting a panel on a spacecraft comprising a panel, means for mounting one end of the panel on a spacecraft for pivoting the panel with respect to the spacecraft between a stowed position and a deployed position, and actuation means comprising a spring sheet capable of storing spring energy and extending between the panel and the spacecraft for actuating the panel to pivot it from one of the stowed and deployed positions to the other wherein the spring sheet is straight in its natural position and is bent when the panel is in said one of the positions for storing spring energy for pivoting the panel from the one position to the other.

12. The arrangement according to claim 11, wherein the spring sheet is bent into a circular quarter arc in said one of the positions.

13. The arrangement according to claim 11, wherein said one position is the stowed position and the other position is the deployed position.

14. An arrangement for mounting a panel on a spacecraft comprising a panel, means for mounting one end of the panel on a spacecraft for pivoting the panel with respect to the spacecraft between a stowed position and a deployed position, and actuation means comprising a spring sheet capable of storing spring energy and extending between the panel and the spacecraft for actuating the panel to pivot it from one of the stowed and deployed positions to the other, wherein said panel is a radiator panel, wherein the radiator panel comprises heat pipes including flexible sections of heat pipes extending between the one end of the panel and the spacecraft to allow pivoting of the panel, and wherein the spring sheet extends parallel to a longitudinal centerline of flexible sections of heat pipes.

15. An arrangement for mounting a panel on a spacecraft comprising a panel, means for mounting one end of the panel on a spacecraft for pivoting the panel with respect to the spacecraft between a stowed position and a deployed position, and actuation means comprising a spring sheet capable of storing spring energy and extending between the panel and the spacecraft for actuating the panel to pivot it from one of the stowed and deployed positions to the other, wherein a mandrel is provided for engaging the spring sheet in the one of the said positions for providing rigidity to the actuation means.

16. An arrangement for mounting a panel on a spacecraft comprising a panel, means for mounting one end of the panel on a spacecraft for pivoting the panel with respect to the spacecraft between a stowed position and a deployed position, and actuation means comprising a spring sheet capable of storing spring energy and extending between the panel and the spacecraft for actuating the panel to pivot it from one of the stowed and deployed positions to the other wherein a restraining cable extends between the panel and a means for retrievably paying out the cable, for controlling the actuation of the panel by the actuation means.

17. A deployable radiator system for rejecting waste heat into outer space from a dynamic isotope power system of a spacecraft, the deployable radiator system comprising a condenser mounted on a spacecraft, a heat pipe evaporator in thermal conducting relation to the condenser, the heat pipe evaporator being in fluid communication with at least one heat pipe radiator panel via a flexible section of a heat pipe which permits the panel to the pivoted relative to the spacecraft for movement between a stowed position and a deployed position, and at least one spring sheet extending between the panel and the spacecraft to both pivotably mount the panel to the spacecraft for pivotable movement relative to the spacecraft and to store spring energy for pivoting the panel to move it from one of the stowed and deployed positions to another.

18. The radiator system according to claim 17, wherein the condenser is a toroidal, shear flow controlled condenser.

19. A method of deploying a panel on a spacecraft comprising the steps of mounting a panel on a spacecraft by means of at least one spring sheet which extends between the panel and the spacecraft so that it can serve as a hinge for pivoting the panel relative to the spacecraft and which at least one spring sheet is capable of storing energy, and utilizing stored energy of the at least one spring sheet to pivot the panel to move it from one of a stowed position and a deployed position to the other while the at least one spring sheet also serves as a hinge for pivotal movement.

* * * * *